United States Patent [19]

Carlson

[11] Patent Number: 4,620,493
[45] Date of Patent: Nov. 4, 1986

[54] SEWAGE SLUDGE DEWATERING USING FLOWING LIQUID METALS

[75] Inventor: Larry W. Carlson, Oswego, Ill.

[73] Assignee: The United States of America as represented by the United States Department of Energy, Washington, D.C.

[21] Appl. No.: 770,907

[22] Filed: Aug. 30, 1985

[51] Int. Cl.⁴ .............................................. F23G 7/04
[52] U.S. Cl. ........................................ 110/346; 34/9; 110/221; 110/224; 110/238
[58] Field of Search ............... 110/346, 221, 224, 238; 34/9; 210/511

[56] References Cited

U.S. PATENT DOCUMENTS

| | | |
|---|---|---|
| 2,723,954 | 11/1955 | Young . |
| 3,909,410 | 9/1975 | Neukamm . |
| 3,985,510 | 10/1976 | Taylor . |
| 4,097,378 | 6/1978 | St. Clair . |
| 4,203,376 | 5/1980 | Hood . |
| 4,429,643 | 2/1984 | Mulholland ........................ 110/238 |

Primary Examiner—Edward G. Favors
Attorney, Agent, or Firm—James W. Weinberger; Arthur A. Churm; Judson R. Hightower

[57] ABSTRACT

A method and apparatus for reducing the moisture content of a moist sewage sludge having a moisture content of about 50% to 80% and formed of small cellular micro-organism bodies having internally confined water is provided. A hot liquid metal is circulated in a circulation loop and the moist sewage sludge is injected in the circulation loop under conditions of temperature and pressure such that the confined water vaporizes and ruptures the cellular bodies. The vapor produced, the dried sludge, and the liquid metal are then separated. Preferably, the moist sewage sludge is injected into the hot liquid metal adjacent the upstream side of a venturi which serves to thoroughly mix the hot liquid metal and the moist sewage sludge. The venturi and the drying zone after the venturi are preferably vertically oriented. The dried sewage sludge recovered is available as a fuel and is preferably used for heating the hot liquid metal.

16 Claims, 1 Drawing Figure

4,620,493

SEWAGE SLUDGE DEWATERING USING FLOWING LIQUID METALS

FIELD OF THE INVENTION

This invention relates generally to the dewatering of sludge, and more particularly to the dewatering of a sewage sludge having a moisture content of about 50% to 80% in the form of small cellular micro-organism bodies having internally confined water.

BACKGROUND OF THE INVENTION

Although commercially available dryers have been provided to dewater sludge, it is difficult to dewater sludge sufficiently because the cellular micro-organism bodies that constitute the sludge develop the consistency of "glue" in an intermediate moisture range between the starting point of about 80% moisture and an acceptable moisture content of less than 50%. These cellular bodies consist of an outer "exoskeleton" lined with a membrane than contains the internal moisture. In order to properly dry such a sludge, the skeleton and membrane must be ruptured and the water therein released. However, if too many of the cells agglomerate before the material is dry enough, the material sticks together and does not dry sufficiently. Temperatures above approximately 160° F. are required to provide sufficient vapor pressure (in a low pressure ambient) to rupture the cells.

Various methods have been disclosed in the prior art for dewatering sludge. For example, in U.S. Pat. Nos. 2,723,954 (Young) and No. 3,909,410 (Neukamm), a method of dewatering sludge using hot solid aggregate particles is disclosed. According to the methods of these patents, moist sludge is mixed with hot aggregate particles so that the sludge coats the particles and is dried. The sludge-coated aggregate particles are then subjected to mechanical stress to break away the coating from the aggregate particles. This forms dewatered sludge particles which are separated from the particles.

A method of dewatering sludge using hot oil is also disclosed in U.S. Pat. No. 4,097,378 (St. Clair). According to this method, the water contained in combustible sludge is dried by adding recycled cool high boiling oil and heating the mixture by direct contact with steam. The oil sludge mixture then has some water separated off comprising the condensed steam and some original water from the sludge. The mixture is then heated again by adding hot oil so that additional water is evaporated off by reducing the pressure. The steam thus produced is used for the direct steam heating of the previous step. The pressure is then again reduced to evaporate off additional water vapor. Finally, the dewatered sludge containing the added oil can be burned as a fuel.

A method for the treatment of waste and the production of heat is disclosed in U.S. Pat. No. 4,203,376 (Hood). According to this method, a solid organic waste is composted, preferably in admixture with sewage sludge, and subsequently the composted waste is burned. The waste is preferably burned in a kiln for calcining an inorganic calcinable material.

A flash reactor unit for treating waste materials is also disclosed in U.S. Pat. No. 3,985,510 (Taylor). The flash reactor unit includes a reactor chamber in which a stream of hot, high velocity exhaust gases are introduced at the bottom thereof. Sanitary waste liquid is sprayed in the chamber at the top of the chamber. In addition, metallic waste objects, such as tin cans, are introduced into the chamber with the hot gases continuously circulating the metallic cans. The surfaces of the metallic objects thus form a reaction surface for vaporizing liquid waste.

SUMMARY OF THE INVENTION

In accordance with the present invention, a method and apparatus are provided for reducing the moisture content of a moist sewage sludge having a moisture content of about 50% to 80% and formed of small cellular micro-organism bodies having internally confined water. This drying of the moist sewage sludge is accomplished using a liquid metal circulation loop including a pump means and a heating means for heating the liquid metal. A mixture of the moist sludge and hot liquid metal is formed by injecting the moist sludge into the loop under conditions of temperature and pressure such that the confined water vaporizes and ruptures the cellular bodies. Thereafter, the liquid metal, dried sludge, and vaporized water are separated in a separation means so that the dried sludge and vaporized water are drawn off from the loop and the liquid metal is left to be recirculated in the loop.

In the preferred embodiment of the present invention, a venturi is provided in the path of the liquid metal stream and the moist sludge is injected into the liquid metal stream adjacent the upstream side of the venturi. Advantageously, the venturi is vertically oriented with the outlet of the venturi connected to a vertical pipe extending upwardly to the separation means.

After separation, the dried sludge is preferably burned as a fuel. Conveniently, a portion of the dried sludge is burned to reheat the liquid metal after separation from the dried sludge.

When the sludge also includes heavy metals, the heavy metals are separated from the sludge together with the liquid metal. Preferably, the hot liquid metal has a melting temperature of 200° F. to 400° F. Conveniently, the liquid metal is a mixture of lead and bismuth.

In order to make use of the generated water vapor, the mixture of the moist sludge and liquid metal is preferably pressurized. In this manner, the vapor generated is a usable steam.

It is an advantage of the present invention that the apparatus provided is self-operating. In other words, the energy provided by the dried sludge is more than sufficient to power the apparatus.

Other features and advantages of the present invention are stated in or apparent from a detailed description of a preferred embodiment of the present invention described hereinbelow.

BRIEF DESCRIPTION OF THE DRAWINGS

The single FIGURE is a schematic elevation view of a sludge drying system according to the present invention.

DETAILED DESCRIPTION OF THE PREFERRED EMBODIMENT

Figure 1:
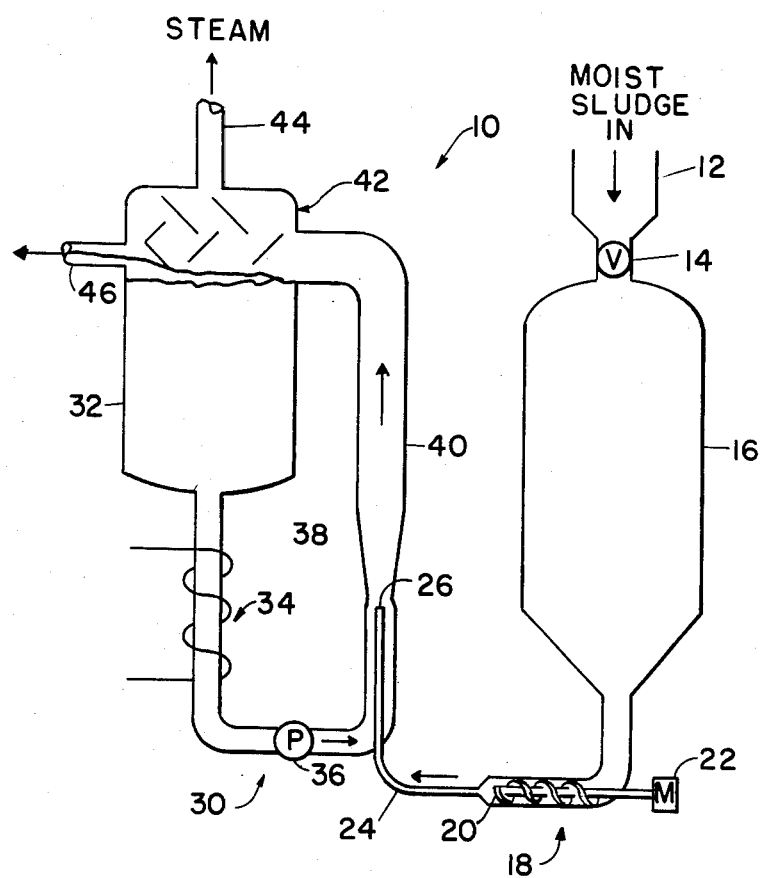

The present invention is designed to dry moist sewage sludge which is characterized by cellular micro-organism bodies containing internal moisture. The moisture content of the moist sewage sludge is usually above 80% and it is desired to dry the sewage sludge to less than 50%. As mentioned above, in the range of 50% to 80%, the cellular bodies agglomerate and form a glue-light mass which is extremely hard to dry. However, if the bodies are prevented from agglomerating, heating to temperatures above 160° F. cause the skeleton and membrane of the bodies to be ruptured and the water released. With this invention, this is accomplished by homogeneously mixing the moist sewage sludge with a hot liquid metal as described below.

With reference now to the drawing in which like numerals represent like elements, a presently preferred embodiment of a sewage sludge dewatering system 10 is depicted. As shown, the moist sewage sludge is initially contained in a hopper 12. From hopper 12, the moist sewage sludge is fed by a valve 14 into a pressurized tank 16. At the bottom of pressurized tank 16 is a feeding means 18. Feeding means 18 includes a screw feeder 20, a motor 22 for rotating screw feeder 20, and an outlet pipe 24 having an outlet end 26.

Dewatering system 10 also includes a liquid metal circulation loop 30. Circulation loop 30 includes a reservoir 32 in which the liquid metal collects. Below reservoir 32, a heating means 34 surrounds circulation loop 30 in order to heat the liquid metal passing thereby. A pump means 36 is also provided after heating means 34 to pump the heated liquid metal through circulation loop 30.

Circulation loop 30 further includes a venturi 38. As shown, venturi 38 is vertically oriented and includes an outlet portion 40 extending upwardly. It should be appreciated that outlet end 26 of outlet pipe 24 is located adjacent the upstream side of venturi 38 as shown.

Outlet portion 44 of venturi 38 is connected to a separating means 42. Separating means 42 includes a steam outlet 44 and a sludge outlet 46.

In operation, dewatering system 10 functions in the following manner. Initially, circulation loop 30 is actuated whereby pump means 36 pumps liquid metal around circulation loop 30. At the same time, heating means 34 is actuated to heat the liquid metal drawn from reservoir 32 to a suitable temperature. Preferably, circulation loop 30 is also pressurized to a desired operating pressure.

After the liquid metal has reached the desired operating temperature, moist sewage sludge is conducted from hopper 12 through valve 14 into tank 16. Feeding means 18 is then actuated so that screw feeder 20 feeds moist sewage sludge through outlet pipe 24 to outlet end 26. At outlet end 26, the moist sewage sludge is injected into the flowing stream of hot liquid metal adjacent the upstream side of venturi 38.

As the moist sewage sludge is injected into the liquid metal stream upstream of venturi 38, a mixture of sludge and liquid metal is formed which passes through venturi 38. In the gradually widening portion of venturi 38, the mixture of sewage sludge and liquid metal mixes thoroughly to form a more or less finely divided or homogeneous mixture. Thereafter, in outlet portion 40, the heat energy from the hot liquid metal is transferred to the sewage sludge. This causes the water inside of the cellular bodies to vaporize and to thereby rupture the skeleton and membrane so that the water vapor contained therein is released. It should be appreciated that the homogeneous mixture of the liquid metal and sewage sludge prevents any accumulation or agglomeration of cellular bodies together so that the forming of a glue-like substance during the transition from 80% moisture to less than 50% moisture does not occur. This drying of the sewage sludge occurs in the vertical region of outlet portion 40.

It should also be appreciated that outlet portion 40 acts somewhat like a "bubble pump" to lift the solid/liquid/vapor mixture contained therein upwards. At the top of outlet portion 40, the mixture flows horizontally to separating means 42. At this time, the vapor rises to the top of the mixture, the sludge accumulates in the middle of the mixture, and the liquid metal falls to the bottom of the mixture. In separating means 42, this separation is completed. The water vapor is drawn off through steam outlet 44 while the dried sewage sludge is withdrawn through sludge outlet 46. The liquid metal, which is heaviest, is thus returned to reservoir 32 wherein the liquid metal is available for further circulation.

In the preferred embodiment, circulation loop 30 is pressurized so that the water vapor generated during the drying is above atmospheric pressure. Thus, the steam withdrawn through steam outlet 44 is available to drive a turbine or the like if desired. In addition, the dried sewage sludge is suitable as fuel. Thus, it should be appreciated that the dried sewage sludge is a suitable fuel for heating the liquid metal with heating means 34.

It should also be appreciated that any heavy metals which occur in the moist sewage sludge are injected together with the moist sewage sludge into liquid metal in circulation loop 30. In separating means 42, these heavy metals are heavier than the dried sludge and thus flow downwardly with the liquid metal into reservoir 32. Therefore, the dried sewage sludge recovered through sludge outlet 46 is free of these dangerous heavy metals. The presence of these heavy metals in the liquid metal is not anticipated to adversely effect the operation of the hot liquid metal in circulation loop 30.

Calculations for a proposed 100 ton per day (moist sludge) plant have been made. The proposed system would use a liquid metal mixture of lead and bismuth and would operate above the melting temperature of such a mixture in the range of 200°–400° F. By circulating approximately 3,000 lbs. per second of liquid metal in a 12" piping system through a 7" venturi throat, a 100 ton per day process would be achieved. The amount of dried sludge produced would allow for the reheating of the liquid metal as well as the generation of 187 kw electric with the remainder of the fuel. It is estimated that more than 10 tons per day of dried fuel having a combustion energy of 10,000 btu/lb. would accrue.

It should further be appreciated that startup of the system may be a problem because the sludge enters the system in a vertical flow. Therefore, it might be advisable to start the system with a steam flow inside of outlet pipe 24 which is equal to the boil off rate. This could be accomplished using a Wilson type boiler taking heat from some of the liquid metal piping surfaces if desired.

Although the present invention has been described with respect to an exemplary embodiment thereof, it will be understood by those of ordinary skill in the art that variations and modifications can be effected within the scope and spirit of the invention.

I claim:

1. A method of reducing the moisture content of a moist sewage sludge having a moisture content of about 50–80% and formed of small cellular micro-organism bodies having internally confined water, the method comprising the steps of:
   circulating a hot liquid metal in a loop;
   forming a mixture of the moist sludge and the hot liquid metal in a portion of the loop under conditions of temperature and pressure such that the confined water vaporizes and ruptures the cellular bodies;

separating the liquid metal, dried sludge, and vaporized water in a separation zone of the loop; and drawing off the dried sludge and vaporized water from the loop whereby the liquid metal is left to be recirculated in the loop.

2. A method of drying sludge as claimed in claim 1 wherein the forming step includes the steps of flowing the liquid metal in a stream and injecting the moist sludge into the liquid metal stream.

3. A method of drying sludge as claimed in claim 2 wherein the flowing step includes the providing of a venturi in the path of the liquid metal stream and the injecting step includes the introducing of the moist sludge into the liquid metal stream adjacent the upstream side of the venturi.

4. A method of drying sludge as claimed in claim 3 wherein the feeding step includes the orienting of the venturi vertically with the outlet of the venturi connected to a vertical pipe extending upwardly to the separation zone.

5. A method of drying sludge as claimed in claim 1 and further including the step of burning the dried sludge as a fuel.

6. A method of drying sludge as claimed in claim 5 and further including the step of reheating the liquid metal after separation from the dried sludge by the burning of a portion of the dried sludge.

7. A method of drying sludge as claimed in claim 1 wherein the separating step also includes the separating of any heavy metal from the sludge by inclusion of the heavy metal with the liquid metal.

8. A method of drying sludge as claimed in claim 1 wherein the hot liquid metal has a melting temperature of 200° F. to 400° F.

9. A method of drying sludge as claimed in claim 8 wherein the liquid metal is a mixture of lead and bismuth.

10. A method of drying sludge as claimed in claim 1 and further including the step of pressurizing the mixture of moist sludge and liquid metal such that the vapor generated is usable steam.

11. An apparatus for reducing the moisture content of a moist sewage sludge having a moisture content of about 50-80% and formed by small cellular microorganism bodies having internally confined water, the apparatus comprising:

a liquid metal circulation loop including a pump means for pumping the liquid metal around said loop and a heating means for heating the liquid metal;

an injecting means for injecting the moist sludge into said loop under conditions of temperature and pressure such that the confined water vaporizes and ruptures the cellular bodies; and a separating means in the loop downstream of the injecting means for separating the vapor and dried sludge from the liquid metal in said loop.

12. An apparatus for drying sludge as claimed in claim 11 and further including a venturi in said loop, and wherein said injecting means includes an outlet adjacent the upstream side of said venturi.

13. An apparatus for drying sludge as claimed in claim 12 wherein said venturi is vertically oriented, and wherein said loop includes a vertical pipe extending upwardly from said venturi and connected to said separating means.

14. An apparatus for drying sludge as claimed in claim 11 wherein said liquid metal has a melting temperature of 200° F. to 400° F.

15. An apparatus for drying sludge as claimed in claim 14 wherein said liquid metal is a mixture of lead and bismuth.

16. An apparatus for drying sludge as claimed in claim 11 wherein said loop is pressurized whereby the vapor produced is usable steam.

* * * * *